United States Patent [19]

Chang

[11] Patent Number: 5,052,640

[45] Date of Patent: Oct. 1, 1991

[54] SPACECRAFT DESIGN ENABLING THE FLAT PACKING OF MULTIPLE SPACECRAFT IN THE LAUNCH VEHICLE

[75] Inventor: Stanley S. Chang, Palos Verdes Estates, Calif.

[73] Assignee: Hughes Aircraft Company, Los Angeles, Calif.

[21] Appl. No.: 400,208

[22] Filed: Aug. 29, 1989

[51] Int. Cl.⁵ .............................................. B64G 1/00
[52] U.S. Cl. .................................. 244/173; 244/158 R
[58] Field of Search .................... 244/173, 159, 158 R

[56] References Cited

U.S. PATENT DOCUMENTS

| | | | |
|---|---|---|---|
| 3,420,470 | 1/1969 | Meyer | 244/158 R |
| 3,948,468 | 4/1976 | Anchutin | 244/173 |
| 4,588,151 | 5/1986 | Mori | 244/173 |
| 4,634,086 | 1/1987 | Mori | 244/173 |
| 4,666,107 | 5/1987 | Berry | 244/173 |
| 4,684,084 | 8/1987 | Fuldner et al. | 244/173 |
| 4,832,113 | 5/1989 | Mims et al. | 244/158 R |

FOREIGN PATENT DOCUMENTS

| | | | |
|---|---|---|---|
| 8901437 | 2/1989 | PCT Int'l Appl. | 244/173 |
| 2103011 | 2/1983 | United Kingdom | 244/173 |

*Primary Examiner*—Joseph F. Peters, Jr.
*Assistant Examiner*—Christopher P. Ellis
*Attorney, Agent, or Firm*—Robert A. Westerlund; Steven M. Mitchell; Wanda K. Denson-Low

[57] ABSTRACT

A spacecraft (100) such as a satellite, is shaped roughly in the form of a disk with a uniform height (104) such that a plurality of such spacecraft may be stowed for launch in a stack (204), thereby enabling a greater number of satellites to be launched simultaneously with a single launch vehicle (220). The flat-pack configuration results from the satellite having a base member (101) with first surface (102) and second surface (103) members abutting the top and bottom opposing major surfaces of the base member in a stowed configuration.

4 Claims, 2 Drawing Sheets

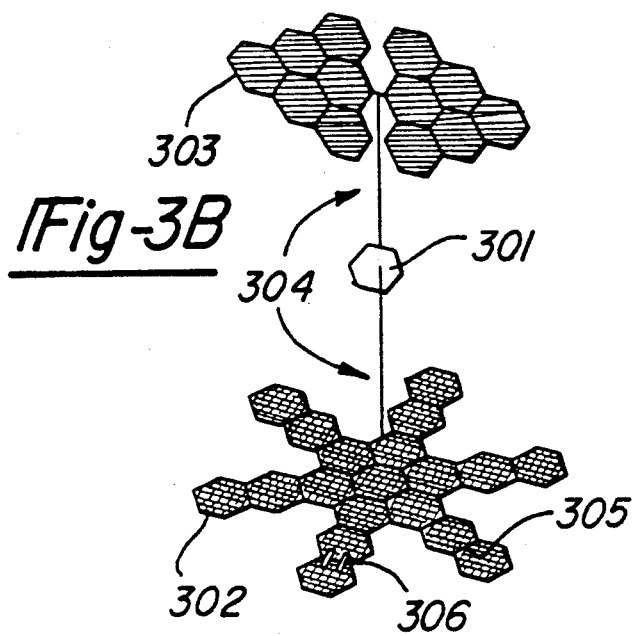
Fig-3B
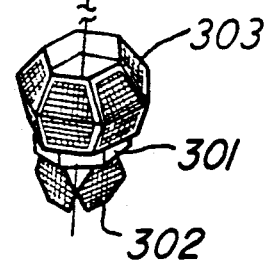
Fig-3D
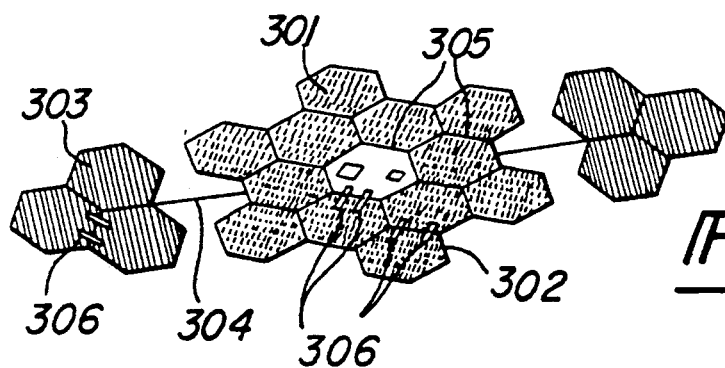
Fig-3C
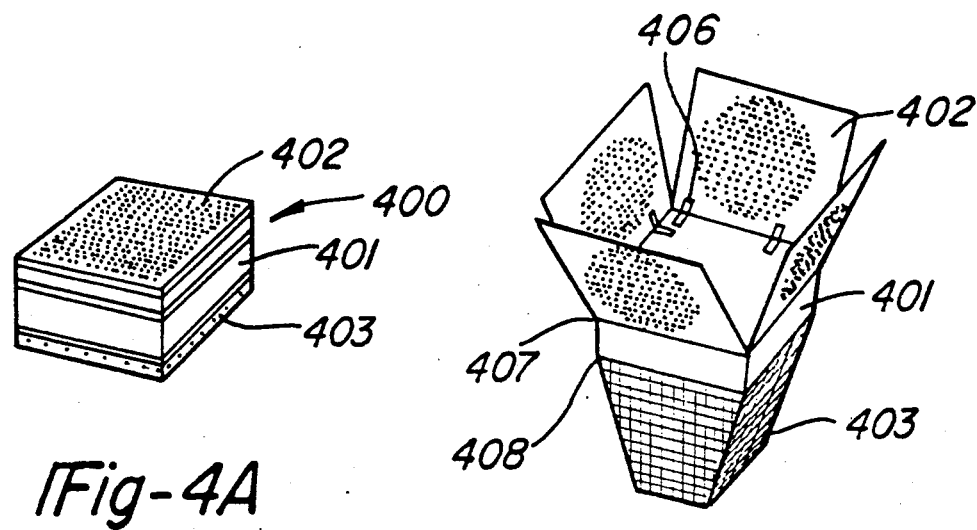
Fig-4A
Fig-4B

SPACECRAFT DESIGN ENABLING THE FLAT PACKING OF MULTIPLE SPACECRAFT IN THE LAUNCH VEHICLE

BACKGROUND OF THE INVENTION

This invention relates generally to the physical design of spacecraft. More specifically, the invention concerns design configurations for groups of satellites intended to be simultaneously launched in a single launch vehicle.

Multiple satellite systems are typically being considered and designed for communication systems and other space applications. With the introduction of multiple satellite systems, a need has arisen for the capability of efficiently and compactly stowing the multiple satellites required for a given mission in a single launch vehicle. It would be economically advantageous to avoid the redesign of currently available launch vehicle stowage compartments and to devise a configuration of satellite or other spacecraft body suitable for enabling the stowage of a large number of identically shaped spacecraft in such launch vehicle stowage compartments.

SUMMARY OF THE INVENTION

It is therefore an object of the invention to fill the need for a spacecraft, e.g. satellite, configuration adapted for use in a multiple satellite system wherein multiple satellites are to be compactly and efficiently stowed for launch in a single vehicle.

Accordingly, the invention comprises a spacecraft body configured in a substantially flat polygonal fashion. In a preferred form, for example, a satellite is formed with a base member for housing the spacecraft's electronics and power supply payload and as a tie down for first surface and second surface members, with the first surface and second surface panels folded and covering the top and bottom surfaces of the base member. The first surface panels may house antennas and the second surface panels may house arrays of photovoltaic devices, such as solar cells. The first surface and second surface panels are both hingedly deployable.

It is a feature of this invention that spacecraft configured in accordance with the principles of this invention may be compactly folded into a thin profile so that they may be stacked in a parallel fashion to achieve the maximum number of spacecraft for stowage in standard size launch vehicle stowage compartments.

It is a further feature of this invention that the number of first surface and second surface members can be varied according to the desired deployed configuration. The flat-pack spacecraft provides maximum antenna aperture with minimum stowed size.

BRIEF DESCRIPTION OF THE DRAWINGS

These and other objects and features of the invention will become apparent from a reading of a detailed description of a preferred embodiment taken in conjunction with the drawing, in which:

FIG. 3A-3D set forth variations on how the antennas and solar cell arrays may be deployed on the spacecraft of the invention;

FIG. 4A is a perspective view of an alternative satellite in the stowed position; and FIG. 4B is a perspective view of the satellite of FIG. 4A in the deployed position.

DETAILED DESCRIPTION

Figure 1A:
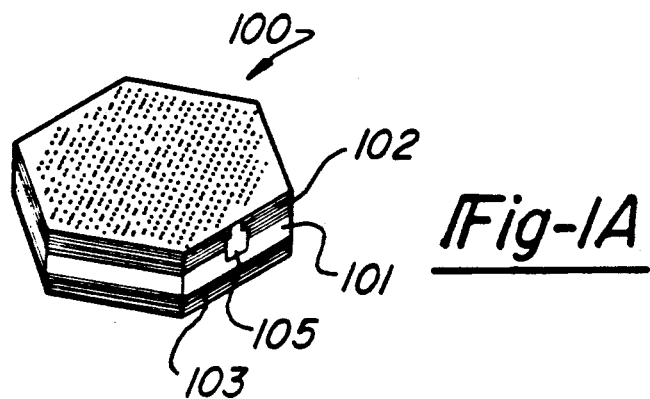
FIG. 1A is a perspective view of a satellite configured in accordance with the principles of the invention in the stowed or non-deployed state.
Figure 1B:
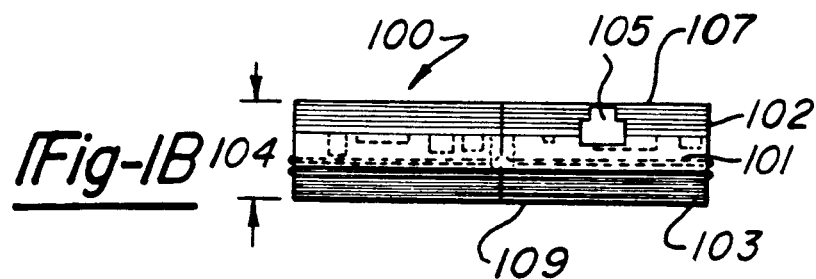
FIG. 1B is a side plan view of the satellite of FIG. 1A in the stowed or non-deployed state.

FIGS. 1A and 1B depict a substantially flat-pack spacecraft 100, being formed by the juncture of a polygonal (in this case hexagonal) base member 101 with first surface panels 102 and second surface panels 103. Panels 102 and 103 are coupled to the base member perimeter along a lateral side surface and/or through an extension boom. Alternatively, first surface and second surface members are connected to one lateral side surface of each other. As a result of this configuration the first surface panels 102 and the second surface panels 103 may be folded onto the base member 101 in a stowed configuration so that the spacecraft 100 maintains a thin oompact profile to enable stowage of the maximum number of spacecraft in a single launch vehicle 220 (see FIG. 2).

In its preferred form, base member 101 is substantially planar and serves as a housing for the electronic circuitry and power storage and solar and/or antenna extension booms of the satellite. The substantially planar first surface members 102 covering the top surface of the base member's polygon are, in the preferred form essentially serving as supports for substantially flat antenna panels 107. The substantially planar second surface members 103 covering the bottom surface of the base member's polygon are, in the preferred form, essentially serving as mounting plates for substantially flat arrays of photovoltaic devices such as solar cells 109. The number of first surface members 102 and second surface members 103 may be varied to accommodate different configurations in order to optimize panel position. The spacecraft panels to be deployed are either (a) allowed to push continuously against other spacecraft below the spacecraft of interest in the stack until, as the spacecraft separate from each other in space, the panels deploy under spring force to the desired position, or (b) locked in place, as by element 105, until the spacecraft are separated and then released by special command.

Figure 2:
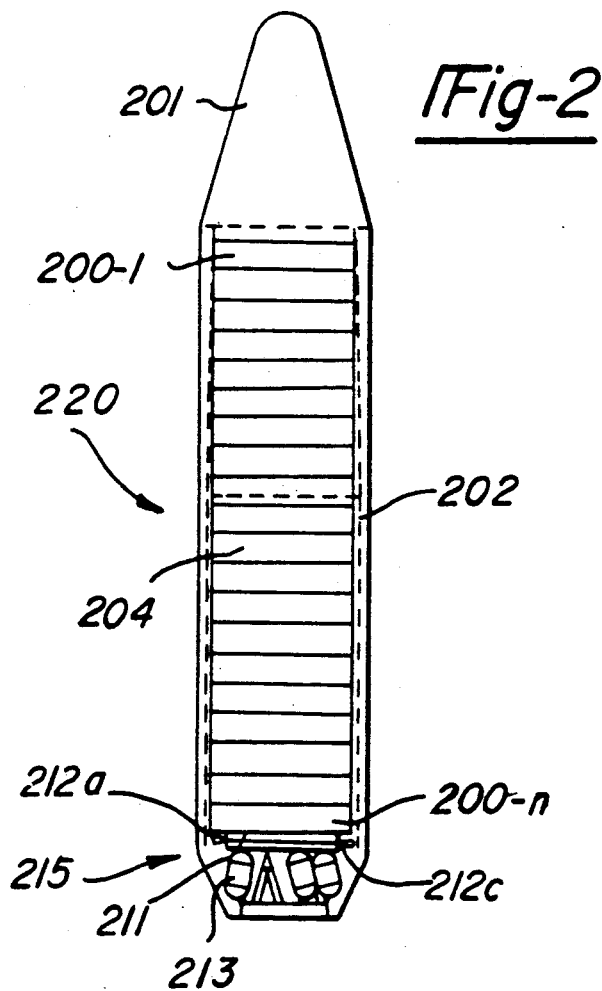
FIG. 2 is a cross-sectional view of a launch vehicle storage area containing a parallel stack of satellites, each configured as in FIGS. 1A and 1B.

Referring now to FIG. 2, it will be seen that satellites configured as in FIGS. 1A and 1B readily lend themselves to a stack of similarly configured spacecraft wherein the first surface panels of the first spacecraft may easily and compactly support the second surface panels of the succeeding spacecraft in the stack.

A typical launch vehicle has a fairing portion 201 surrounding an inner stowage cavity 202 which contains a stack 204 of satellites, each configured as shown in FIGS. 1A and 1B. Starting with the first satellite in the stack 200-1, it is seen that each succeeding satellite is stacked directly upon each preceding satellite and the stack continues in this manner until the last satellite 200-n.

The stack of satellites 204 configured in accordance with the invention may be dispensed or deployed from the launch vehicle body either one-by-one or in groups of more than one. The leading satellite 200-! is shown at the end of the stack remote from the dispensing apparatus and the final satellite 200-n is shown coupled to a suitable dispensing means 2!5. The stack of satellites 204 is secured for launch and transport by launch vehicle 220 with a first clamp frame (not shown) and a second clamp frame (not shown). The stack 204 is secured in spring loaded fashion to tie down plate 211 by spring loaded removable fasteners such as pyrotechnic bolts at each corner of the polygon base member. The tie down assembly and the spring loaded pyrotechnic bolt are not shown in detail, as such releasable fastening mechanisms are known in the art and do not form a material part of the invention. Mounted to the tie down plate 211 are a plurality of thrusters as needed, two being shown in FIG. 2 and designated 212a, and 212c (with a third thruster not shown in this view). Adjacent the tie down plate are thruster fuel tanks 213. It will be seen that the combination of the tie down plate 211, tension tie down thrusters 212a–c, and thruster fuel tanks 213 may be considered to comprise dispenser mechanism 215.

To dispense the stack of satellites, the thrusters are first used to orient the stack (or a single satellite if deployment is to be one spacecraft at a time). Next, the pyrotechnic bolts are detonated at the corners of the tie down plate and the springs then eject the stack (or a single spacecraft) away from the tie down plate. It will be seen that a tie down plate and appropriate spring loaded bolts may be attached to the base member of either the first of a group of satellites to be deployed simultaneously or, in the case of one-by-one dispensation, such apparatus would be placed between every satellite in the parallel stack. The parallel stack of spacecraft may be used to full space-saving advantage by placing dispenser mechanism 215 at either end of the stack.

Figure 3A:
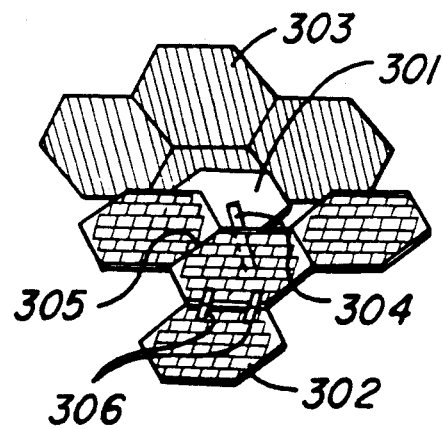

FIGS. 3A–3D depict alternative deployed configurations of the satellite of FIGS. 1A and 1B. FIGS. 3A and 3B show the satellite of FIGS. 1A and 1B deployed with its antenna panels 302 and solar cell panels 303 attached to the base member 301 via an extension boom 304. The individual antenna panels 302 and the individual solar cell panels 303 are attached to one lateral side surface 305 of each other via hinges 306. The hinges 306 are simple spring mechanism and/or a latch mechanism depending on the particular application. The extension boom 304 can be one of telescopic, spiral or folded hinged tubing housed in the base member 301 also depending on the particular application. The hinges 306 and the extension booms 304 are not shown in detail, as such fastening devices are known in the art and do not form a material part of the invention.

FIG. 3C shows the satellite of FIGS. 1A and 1B deployed with its antenna panels 302 attached to the base member 301 perimeter along a lateral side surface 305 via hinges 306 and also along one lateral side surface 305 of an adjoining antenna via hinges 306. The solar cell panels 303 are attached to the base member 301 via an extension boom 304 and the individual solar cell panels are attached to an adjoining solar cell panel via hinges 306.

FIG. 3D depicts the satellite of FIGS. 1A and 1B in the deployed state with the antenna panels 302 hinged to the base member 301 on the bottom lateral surface, and the solar cell panels 303 hinged to the base member 301 on the top lateral surface. This is to show that the antenna panels 302 and the solar cell panels 303 can be interchangeably connected to the base member 301 on either side. It is also feasible that both the antenna and solar cell panels can be on one or both sides of the base member 301. The number of panels a satellite will contain and their configuration will be determined by the desired amount of power the satellite requires.

While the spacecraft of FIGS. 1A and 3A–3D are depicted with a hexagonal base member and hexagonal first and second surface members, it is to be understood that the invention contemplates the use of many alternative spacecraft base member forms, e.g., any of the familiar polygons such as a square or any nonpolygon configuration such as a circle. The specific form does not matter so long as the spacecraft can be stacked upon each other in a fashion similar to a stack of dominoes.

FIGS. 4A and 4B set forth the square alternative in the stowed and deployed position. FIG. 4A depicts a substantially flat-pack spacecraft 400 in the stowed position being formed by the juncture of a polygonal base member 401 with the first surface panels 402 and the second surface panels 403 which are coupled to the base member perimeter along a lateral side surface and/or through an extension boom. Alternatively, the first surface and second surface members are connected to one lateral side surface of each other. As a result of this configuration the first surface panels 402 and the second surface panels 403 are folded onto the base member 401 so that the spacecraft 400 maintains a thin compact profile to achieve the maximum number of spacecraft in a launch vehicle.

FIG. 4B depicts the satellite of FIG. 4A in the deployed position with its antenna panels 402 attached to the top of the base member 401 perimeter along a lateral side surface 407 via hinges 406. The solar cell panels 403 are attached to the bottom of the base member 401 perimeter along a lateral side surface 408 also via hinges 406. This square configuration could also attach the first surface and second surface members to the base member via an extension boom. The first surface and second surface members could contain multiple panels that would hinge with the adjoining panels.

It will be appreciated that, depending upon the type of mission, the spacecraft's first surface and second surface members could carry or comprise a variety of equipment in addition to, or in place of, the antenna panels or solar cell arrays depicted in FIG. 1A through FIG. 4B. For example, certain missions might call for the surface members to carry thin sensors or other scientific instruments or electronic equipment.

Hence, spacecraft designed in accordance with the principles of this invention are more easily adapted to relatively improved, compact stacks of multiple satellites where required for multiple satellite system missions.

The invention has been explained with reference to a detailed description of a preferred embodiment with some exemplary alternatives. It is to be understood that such descriptions have been given for the sake of example only and are not intended to limit the scope and spirit of the invention defined by the appended claims. It should be noted that while the preferred approach is to provide planar first and second surface members coupled to a planar base member, the invention contemplates any number of spacecraft shapes, so long as the configuration results in a flat stowed position and is provided and adapted for receipt of another identical spacecraft to be stacked upon it.

What is claimed is:

1. In a launch vehicle including a stowage compartment for stowing spacecraft to be deployed at a time subsequent to initial launch of the vehicle, an improved arrangement for stowing the spacecraft, comprising:

a plurality of spacecraft stacked upon one another in a flat-pack configuration to thereby facilitate deployment of each of said spacecraft in a precisely controllable and aerodynamically stable manner;

wherein each of said spacecraft includes:
- a base member having opposed first and second major surfaces;
- a first panel member having opposed first and second major surfaces;
- a second panel member having opposed first and second major surfaces;

first means for attaching said first panel member to said base member in such a manner as to facilitate movement of said first panel member from a first, stowed position whereby a substantial portion said first major surface of said base member, to thereby impart a substantially flat profile to the spacecraft, to a second, deployed position whereby said first panel member is angularly oriented with respect to said base member; and, second means for attaching said second panel member to said base member in such a manner as to facilitate movement of said second panel member from a first, stowed position whereby a substantial portion of said first major surface of said second panel member is in direct contact with said second major surface of said base member, to thereby impart a substantially flat profile to the spacecraft, to a second, deployed position whereby said second panel member to angularly oriented with respect to said base member; and, wherein said spacecraft are stacked in a manner such that said second major surface of said second panel member and said second major surface of said first panel member of intermediate ones of said spacecraft are in direct contact with one another.

2. The arrangement as set forth in claim 1, wherein said base member houses an electronics and power supply payload.

3. The arrangement as set forth in claim 2, wherein said first panel member includes a deployable antenna panel mounted thereto.

4. The arrangement as set forth in claim 3, wherein said second panel member includes a deployable solar power panel mounted thereto.

* * * * *

UNITED STATES PATENT AND TRADEMARK OFFICE
CERTIFICATE OF CORRECTION

PATENT NO. : 5,052,640

DATED : October 1, 1991

INVENTOR(S) : Stanley S. Chang

It is certified that error appears in the above-identified patent and that said Letters Patent is hereby corrected as shown below:

Column 2, line 22, the word "compact" is misspelled.

Column 2, line 64, please delete "200-!" and insert instead --200-1--.

Column 2, line 67, please delete "2!5" and insert instead --215--.

Column 4, line 68, please place a comma (,) after the word "configuration".

Column 5, line 13, after the word "portion" please insert --of--.

Column 5, line 14, please delete "base" and insert instead --first panel--.

Column 5, line 14, after the word "member" please insert --is in direct contact with said first major surface of said base member--.

UNITED STATES PATENT AND TRADEMARK OFFICE
CERTIFICATE OF CORRECTION

PATENT NO. : 5,052,640

DATED : October 1, 1991

INVENTOR(S) : Stanley S. Chang

It is certified that error appears in the above-identified patent and that said Letters Patent is hereby corrected as shown below:

Column 6, line 5, please delete "to" and insert instead --is--.

Signed and Sealed this

Twenty-fifth Day of May, 1993

Attest:

MICHAEL K. KIRK

*Attesting Officer*  Acting Commissioner of Patents and Trademarks